United States Patent [19]

Blank

[11] 3,755,272

[45] Aug. 28, 1973

[54] COPOLYMERIZATION OF $C_8$ $C_{30}$ $\alpha$-OLEFINS AND ACRYLIC ACID OR METHARCRYLIC ACID

[75] Inventor: Werner Josef Blank, Stamford, Conn.

[73] Assignee: American Cyanamid Company, Stamford, Conn.

[22] Filed: Apr. 1, 1971

[21] Appl. No.: 130,529

[52] U.S. Cl............. 260/80.78, 117/128.4, 204/39, 260/32.8 R, 260/33.4 R, 260/41 B, 260/80.8, 260/88.1 R
[51] Int. Cl. .............................................. C08f 1/60
[58] Field of Search...................... 260/80.8, 88.1 R, 260/80.78

[56] References Cited
UNITED STATES PATENTS

| | | | |
|---|---|---|---|
| 2,411,599 | 11/1946 | Sparks et al. | 204/162 |
| 3,160,612 | 12/1964 | Stewart et al. | 260/78 |
| 3,183,217 | 5/1965 | Serniuk et al. | 260/85.5 |

*Primary Examiner*—Joseph L. Schofer
*Assistant Examiner*—Stanford M. Levin
*Attorney*—Frank M. Van Riet

[57] ABSTRACT

There is provided an improved process for effecting the copolymerization of $\alpha$-olefins and acrylic acid or methacrylic acid by adding to (A) a non-iso $\alpha$-olefin containing from 8 to 30 carbon atoms, or more, at temperatures ranging from about 120° C. to about 200° C., (B) acrylic acid or methacrylic acid monomer in the presence of a free radical initiator and in the absence of both an hydroxy-containing compound and a Friedel Crafts catalyst, the latter monomer being added at a rate whereby not more than 20 percent of monomer other than the $\alpha$-olefin, based on the $\alpha$-olefin charged, remains as monomer in admixture during addition of said monomer.

8 Claims, No Drawings

COPOLYMERIZATION OF $C_8$-$C_{30}$ α-OLEFINS AND ACRYLIC ACID OR METHACRYLIC ACID

This invention relates to the copolymerization of (1) a non-iso, α-olefin containing from about 8 to about 30 carbon atoms, or more, and (2) an acrylic acid monomer in the absence of an hydroxy-containing compound. More particularly, the invention relates to the copolymerization of a higher alkyl, non-iso, α-olefin and an acrylic acid in the absence of hydroxy-containing solvents or Friedel Crafts catalysts to obtain a water-soluble or water dispersible resin. Still more particularly, the invention is concerned with a process for effecting the copolymerization of a non-iso, α-olefin containing from about 8 to about 30 carbon atoms, or more, by adding to said α-olefin in the presence of a free radical initiator at temperatures maintained from 120° C. to 200° C. at least an acrylic acid monomer in the presence or absence of a monoethylenically unsaturated compound such as styrene and/or an acrylic ester and in the absence of hydroxy-containing solvents or catalysts, at a rate wherein not more than 20 percent of said monomers other than the α-olefins, based on the weight of said α-olefin charge, remains as monomers in admixture during addition of said monomer.

It is known that iso-olefins can be heteropolymerized with an unsaturated ester, such as methyl acrylate in the presence of ultra-violet light and/or a free radical initiator such as a peroxide catalyst. Unfortunately, this method is not wholly satisfactory, since resins, absent a carboxyl function, are prepared. In this connection, attention is directed to U.S. letters Pat. No. 2,411,599, wherein it is stated that the absence of the iso-olefinic structure prevents the heteropolymerization of, for instance, methyl acrylate and 3-methyl butene-1. The resins so produced are substantially soluble in solvents and insoluble in water. It is also known that α-olefins can be reacted with acrylic acid which is initially complexed with a Friedel Crafts halide present in amounts at least equal to the weight of the acrylic acid monomer. Further, in U.S. letters Pat. No. 3,183,217, for instance, it is a prime requirement that a halide, such as zinc chloride, be employed to effect olefin copolymerization. Consequently, the latter catalyst had to be removed and recovered. If a process could be developed for effecting copolymerization of an α-olefin and an acrylic acid in the absence of a Friedel Crafts catalyst, thereby avoiding the time and treasury consuming steps of removing and recovering the latter, such would meet a long-felt need in the art.

It has been found that the copolymerization of (1) a higher alkyl, non-iso, α-olefin containing from about 8 to about 30 carbon atoms, or more, and (2) at least an acrylic acid mono-mer, in the presence of a polymer catalyst, such as benzoyl peroxide, butyl peroxide and in the absence of a Friedel Crafts catalyst and an hydroxy-containing compound, can be readily attained. Copolymerization is effected in a straight-forward manner by adding to the said α-olefin in the presence of a free radical initiator at a temperature ranging from about 125° C. to about 200° C. an acrylic acid monomer at a rate, whereby not more than 20 percent of said acrylic acid monomer or monomer other than the α-olefin remains as such in the mixture. Thus, an α-olefin containing polymer is obtained by the addition of acrylic acid or methacrylic acid and, optionally, a second unsaturated vinyl monomeric compound or a mixture of vinyl unsaturated monomeric compounds such as styrene, methyl styrene, butyl acrylate and equivalents thereof to a non-iso, α-olefin in the presence of a free radical initiator such as a peroxide and the like at reaction or polymerization temperatures of from about 125° C. to about 200° C. At the latter temperatures almost instantaneous polymerization of the acrylic acid and/or methacrylic acid and/or the aforementioned vinyl compounds occurs. The amount of unreacted acrylic acid and/or unreacted methacrylic acid and/or vinyl compounds should not exceed 20 percent of the α-olefin charge exclusive of the presence of α-olefin monomer present at any time during the addition period. Otherwise, copolymerization of the α-olefin is markedly reduced.

The polymer so prepared finds utility in electrodeposition paints, water soluble spray or dip paints, floor coatings and textile treatments.

With respect to the higher alkyl, non-iso, α-olefin monomer which may be straight or branched chain, there can be mentioned: 1-octene, 1-nonene, 3-methyl-1-octene, 4-ethyl-1-nonene, 1-decene, 1-dodecene, 1-octadecene, 1-pentacdecene, and mixtures thereof, such as the $C_{15}$ – $C_{18}$ mixture obtained from the Chevron Chemical Company as well as the $C_{30}$+mixture of α-olefins, obtained from Gulf Oil Company, which α-olefins consist of approximately 30% $C_{22}$ – $C_{28}$ α-olefins and 70% $C_{30}$+ α-olefins.

In general, any acrylic acid or equivalent thereof such as acrylic acid methacrylic acid, cinnamic or crontonic acid may be employed as the reactive monomer. If desired, there may also be present along with the acid the corresponding esters of the same, such as the acrylic or methacrylic esters derived from monohydric aliphatic alcohols containing from 1 to about 12 carbon atoms. Thus, there is contemplated for use herein, methyl acrylate, ethly methacrylate or lauryl acrylate.

Advantageously, the copolymerization of the present invention takes place in the presence of a free radical initiator, such as a peroxide and equivalents thereof, within the following weight percentage parameters based on the overall mixture:

A. From 5%–40% of the above-defined higher alkyl, non-iso, α-olefin, and preferably between 5% and 20%, B. From 5%–20% of an acrylic acid, and preferably between 8% and 18%, C. From 0%–90% of styrene, and preferably between 5% and 70%, and D. From 0%–90% of an acrylic or methacrylic acid ester, and preferably between 5% and 80%.

As stated above, copolymerization of the higher alkyl α-oefin can take place only in the absence of an hydroxy-containing compound. Where such hydroxyl compound is present, copolymerization is substantially completely inhibited.

The following examples further illustrate the invention but are not limitative thereof except as indicated in the appended claims. All parts and percentages are by weight unless otherwise specified.

EXAMPLE 1

To a suitable reaction vessel equipped with stirrer, thermometer, nitrogen inlet, reflux condenser and monomer inlet are charged 50 parts of ethyl amyl ketone, 100 parts of $C_{15}$ – $C_{18}$ non-iso, α-olefin mixture obtained from Chevron Chemical Company, which is then heated to 150° C. To the heated solvent mixture are fed at a constant rate over a period of 2 hours 150 parts of butyl acrylate, 175 parts of styrene, 75 parts of acrylic acid, 10 parts of di-t-butyl peroxide as the polymerization catalyst and 10 parts of n-dodecyl mercaptan as the chain transfer agent. During the first and second hours of monomer blend addition to the α-olefin reactant, samples are periodically withdrawn from the reactor and analyzed by vapor phase chromatography for free unreacted monomers. Such vapor phase chromatography indicates the presence of 3 percent of the monomers added (other than α-olefins) based on the weight of said α-olefins.

The resultant polymer solution is cooled to 130° C. and diluted with 2-ethoxyethanol to a solids content of 75 percent. Analysis by vapor phase chromatography of the finished product shows that about 60 parts of the α-olefin monomers have been copolymerized.

For many applications, the unreacted α-olefins need not be separated or removed from the copolymer solution.

EXAMPLE 2

This example illustrates the addition of all the monomers in one step to effect copolymerization.

To a suitable reaction vessel equipped with stirrer, thermometer, nitrogen inlet, reflux condenser and monomer inlet are charged 50 parts of ethyl amyl ketone, 100 parts of $C_{15} - C_{18}$ non-iso, α-olefin mixture obtained from Chevron Chemical Company, 150 parts of butyl acrylate, 175 parts of styrene, 75 parts of acrylic acid, 10 parts of di-t-butyl peroxide as the polymerization catalyst and 10 parts of n-dodecyl mercaptan as the chain transfer agent. The entire charge is heated to 150° C. and held at that temperature for 2 hours.

The resultant polymer solution is cooled to 130° C. and diluted with 2-ethoxyethanol to a solids content of 75 percent. Analysis by vapor phase chromatography of the finished product shows that about 7.5 parts of the α-olefin monomers have been copolymerized.

EXAMPLE 3

Repeating the procedure of Example 1 in every detail except that the temperature for effecting copolymerization is increased from about 150° C. to about 170° C. to 180° C. On vapor phase chromatography analysis, 70 parts of the α-olefin are found to be copolymerized.

The polymer solution exhibits only slight reflux during the addition period. This phenomenon indicates that only small amounts, i.e., about 5 percent, of unreacted monomer other than α-olefin are present during the addition period.

EXAMPLE 4

The procedure of Example 1 is repeated in every detail except that the ethyl amyl ketone solvent is omitted from the reaction. It is found that 65 parts of the α-olefins are copolymerized.

EXAMPLE 5

To a suitable reaction vessel equipped as in Example 1 above are added 100 parts of ethyl amyl ketone and 50 parts of non-iso, α-olefins containing from 15 to 18 carbon atoms and obtained from the Chevron Chemical Company. The mixture is heated to from 160° C. to 170° C. There is next added over a 3 hour period, while maintaining the temperature at 160° C., a mixture blend of 225 parts of butyl acrylate, 150 parts of styrene, 75 parts of acrylic acid, 10 parts of di-t-butyl peroxide and 10 parts of n-dodecyl mercaptan.

Samples are withdrawn at 15 minute intervals during the addition period. On analysis of the samples by vapor phase chromatography (VPC), there is noted a free monomer content therein between 6 percent and 8 percent, (other than the α-olefins added), based on the α-olefin charge.

The resultant polymer solution is next cooled to room temperature and diluted with 30 parts of 2-ethoxy ethanol. On analysis it has been found that 100 percent of the α-olefins present had been copolymerized.

Replacing acrylic acid with methacrylic acid, a similar polymeric solution is obtained.

EXAMPLE 6

Repeating Example 5 in every material aspect, except that diacetone alcohol is used in lieu of ethyl amyl ketone.

On analysis, copolymerization of the α-olefin could not be detected.

EXAMPLE 7

The procedure of Example 5 is repeated in every respect except that the free radical initiator, the di-t-butyl peroxide catalyst, is replaced by t-butyl hydroperoxide. On analysis, no copolymerization of the α-olefin is found to have occurred.

EXAMPLE 8

Repeating Example 5 in every detail except that ethyl amyl ketone is replaced by n-butanol. On analysis, copolymerization of the α-olefin could not be detected in the resultant mixture.

EXAMPLE 9

The procedure of Example 1 is repeated in every detail except that 100 parts of 1-dodecene is employed. On analysis, it is found that about 45 parts of the α-olefin had copolymerized.

EXAMPLE 10

100 parts of an α-olefin $C_{30}+$ (Gulf Oil Company) are charged into a suitable reaction vessel and heated under a nitrogen blanket to 165° C. A blend of 175 parts of butylacrylate, 150 parts styrene, 75 parts acrylic acid, 10 parts di-t-butyl peroxide and 10 parts n-dodecyl mercaptan is fed at a constant rate over a 3 hour period into the reaction vessel. During the addition period it was noted that only very slight reflux takes place, indicating almost immediately polymerization of the monomer blend other than the α-olefins during the addition period. Samples taken from the reaction vessel periodically during polymerization show an unreacted monomer content of below 5 percent (other than the α-olefins) based on the weight of the α-olefin charge. After all of the monomers had been added, the reaction mixture is kept for 2 hours at 165° C. Subsequent to the 2 hour holding period, the polymer solution is cooled to 140° C. and 170 parts of n-butanol are added. The final solution is slightly hazy and very viscous, but no phase separation takes place.

EXAMPLE 11

67 Parts of the polymer solution in Example 10 are blended with 17 parts of monomeric hexakis (ethoxymethyl) melamine, 7.3 parts of diisopropanolamine and 33 parts of titanium dioxide rutile. The mixture is dispersed on a high speed dissolver in 880 parts of deionized water. This 10 percent dispersion is placed in an electrodeposition cell or bath and deposited on a steel anode at a potential difference of 400 volts for 2 minutes. After washing the electrodeposited steel anode with water and curing or baking the same at 175° C. for 20 minutes, a very hard and elastic coating is obtained. The coating exhibits good mar resistance.

I claim:

1. In a process for copolymerizing (1) a $C_8$–$C_{30}$, non-iso, α-olefin and (2) a comonomer comprising acrylic acid or methacrylic acid, each alone or in admixture with at least one other copolymerizable vinyl monomer, in the presence of a free radical peroxy initiator, the improvement which comprises: copolymerizing (1) and (2) in the absence of any hydroxy-containing compound and any Friedel Crafts halide, at a temperature ranging from 120° C. to 200° C. by adding (2) to (1) at such a rate whereby no more than about 20 percent of (2), based on the weight of (1), at any time remains as monomer in the reaction media during the addition thereof and thereafter recovering the resultant copolymerized α-olefin product.

2. The process of claim 1 in which (2) is acrylic acid.

3. The process of claim 1 wherein (2) is methacrylic acid.

4. The process according to claim 1 wherein (2) is acrylic acid admixed with at least another unsaturated vinyl monomer selected from the group consisting of ethyl acrylate, styrene and butyl acrylate.

5. The process according to claim 1 wherein the α-olefin is 1-dodecene.

6. The process according to claim 1 wherein the α-olefin is a $C_{15}$ – $C_{18}$ non-iso mixture.

7. The process according to claim 1 wherein the α-olefin is a $C_{30}$ non-iso mixture.

8. The process according to claim 1 wherein the free radical initiator is di-t-butyl peroxide.

* * * * *